(12) United States Patent
Huang et al.

(10) Patent No.: US 10,043,460 B2
(45) Date of Patent: Aug. 7, 2018

(54) DISPLAY PANEL

(71) Applicant: INNOLUX CORPORATION, Chu-Nan, Miao-Li County (TW)

(72) Inventors: I-Hua Huang, Chu-Nan (TW); Wan-Shan Yang, Chu-Nan (TW); Chun-Teng Chen, Chu-Nan (TW); Yu-Ju Chen, Chu-Nan (TW); Kuei-Ling Liu, Chu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 474 days.

(21) Appl. No.: 14/591,694

(22) Filed: Jan. 7, 2015

(65) Prior Publication Data
US 2015/0310811 A1 Oct. 29, 2015

(30) Foreign Application Priority Data
Apr. 29, 2014 (TW) .............................. 103115370 A

(51) Int. Cl.
G02F 1/1337 (2006.01)
G09G 3/36 (2006.01)
G02F 1/1335 (2006.01)

(52) U.S. Cl.
CPC ......... *G09G 3/36* (2013.01); *G02F 1/133512* (2013.01); *G02F 1/133703* (2013.01); *G02F 1/133788* (2013.01); *B32B 2457/202* (2013.01); *G09G 2300/0404* (2013.01); *G09G 2300/0408* (2013.01); *G09G 2320/02* (2013.01)

(58) Field of Classification Search
None
See application file for complete search history.

(56) References Cited

U.S. PATENT DOCUMENTS

| 8,537,328 B2 | 9/2013 | Lee et al. |
| 2003/0151703 A1 | 8/2003 | Nakanishi et al. |
| 2003/0231272 A1* | 12/2003 | Nakamura ........ G02F 1/133703 349/123 |

(Continued)

FOREIGN PATENT DOCUMENTS

| CN | 1900796 | 1/2007 |
| JP | H06194630 | 7/1994 |

(Continued)

OTHER PUBLICATIONS

Report of Utility Model Technical Opinion issued by the Japan Patent Office for corresponding Japanese Utility Model Application No. 2015-092051 dated Apr. 26, 2016.

*Primary Examiner* — Anthony J Frost
(74) *Attorney, Agent, or Firm* — Liu & Liu

(57) ABSTRACT

A display panel is disclosed, which comprises: a first substrate; a second substrate opposite to the first substrate; a liquid crystal layer disposed between the first substrate and the second substrate; a shielding pattern disposed on the second substrate and comprising a first region and a second region, in which a transmittance of the first region is larger than that of the second region; and a first aggregation layer disposed on a side of the first substrate facing to the second substrate, wherein a roughness of the first aggregation layer corresponding to the first region of the shielding pattern is larger than that of the first aggregation layer corresponding to the second region thereof.

7 Claims, 6 Drawing Sheets

(56) References Cited

U.S. PATENT DOCUMENTS

| | | | |
|---|---|---|---|
| 2008/0198309 A1* | 8/2008 | Chen | G02F 1/133707 |
| | | | 349/106 |
| 2012/0002142 A1 | 1/2012 | Asaoka et al. | |
| 2012/0252299 A1 | 10/2012 | Shen et al. | |
| 2012/0257146 A1 | 10/2012 | Su et al. | |

FOREIGN PATENT DOCUMENTS

| | | |
|---|---|---|
| JP | H10213802 | 8/1998 |
| JP | H11167114 | 6/1999 |
| JP | 2010-217523 | 9/2010 |
| JP | 2010-217523 A | 9/2010 |
| JP | 2011-197643 | 10/2011 |
| KR | 1020060084202 | 7/2006 |
| TW | I419962 | 12/2013 |
| TW | I425281 | 2/2014 |

* cited by examiner

DISPLAY PANEL

CROSS REFERENCE TO RELATED APPLICATION

This application claims the benefits of the Taiwan Patent Application Serial Number 103115370, filed on Apr. 29, 2014, the subject matter of which is incorporated herein by reference.

BACKGROUND OF THE INVENTION

1. Field of the Invention

The present invention relates to a display panel and, more particularly, to a display panel with aggregations having specific structures.

2. Description of Related Art

In recent years, all the display devices are developed toward having small volume, thin thickness and light weight as the display techniques progresses. A liquid crystal display (LCD) device is a flat panel display device with a thin thickness, so a conventional cathode ray tube (CRT) display is gradually replaced by the LCD. Especially, the LCD can be applied to various fields. For example, the daily used devices such as cell phones, notebooks, video cameras, cameras, music players, navigation devices, and televisions are equipped with liquid crystal display (LCD) panels.

The brightness, the contrast, the color and the viewing angles are main parameters related to the viewing effect of the LCD panels. As the developments of the LCD devices, the main stream or developing LCD panels can be divided into: twisted nematic (TN) mode, vertical alignment (VA) mode, and in-plane switching (IPS) mode.

For the VA mode LCD, the firstly developed multi-domain vertical alignment (MVA) technology is achieved by disposing protrusions on a color filter substrate to keep liquid crystal molecules with predetermined angles (also called as pre-tilt angles) in the static state. Hence, when a voltage is applied to the LCD, the liquid crystal molecules can tilt more quickly. Meanwhile, the protrusions can change the alignment of the liquid crystal molecules to achieve the purpose of wide viewing angles. Except for the MVA technology, a polymer-stabilizing alignment (PSA) technology is also developed, wherein a polymer layer with microstructures is used to replace the protrusions used in the MVA technology to achieve the purpose of wide viewing angles and rapid response. Hence, the VA mode LCD is currently used in the current high level LCD.

SUMMARY OF THE INVENTION

An object of the present invention is to provide a display panel with an aggregation layer having specific structures for facilitating tilts of liquid crystal molecules and alignments thereof to improve a response rate of a liquid crystal layer of the display panel.

Another object of the present invention is to provide a method for manufacturing a display panel with an aggregation layer having specific structures.

To achieve the object, a method for manufacturing a display panel of the present invention comprising: providing a first substrate and a second substrate opposite to the first substrate; forming a shielding pattern comprising an opening region and a shielding region on the second substrate; injecting a liquid crystal material comprising liquid crystal molecules and photosensitive monomers into a space between the first substrate and the second substrate; and applying an irradiation from the second substrate to polymerize the photosensitive monomers to form an aggregation layer on at least one of the first substrate and the second substrate. The obtained aggregation layer can be used with an alignment layer as a layer causing pre-tilt angles of the liquid crystal molecules. In addition, during the polymerization process, a voltage may be selectively applied onto different regions to make the liquid crystal molecules have predetermined pre-tilt angles in advance.

In addition, one aspect of the present invention is to provide a display panel prepared with the aforementioned method, which comprises: a first substrate; a second substrate opposite to the first substrate; a liquid crystal layer disposed between the first substrate and the second substrate; a shielding pattern disposed on the second substrate and comprising a first region and a second region, in which a transmittance of the first region is larger than that of the second region; and a first aggregation layer disposed on a side of the first substrate facing to the second substrate, wherein a roughness of the first aggregation layer corresponding to the first region of the shielding pattern is larger than that of the first aggregation layer corresponding to the second region thereof.

Herein, the transmittance of the first region and the second region is not particularly limited, and the first aggregation layer having different roughness can be obtained as long as the transmittance of the first region is larger than that of the second region. In one case, the first region of the shielding pattern corresponds to an opening region, and the second region thereof corresponds to a shielding region. Preferably, the transmittance of the first region of the shielding pattern is 30~100%, or that of the second region thereof is 0~20%. Herein, the term "aggregation layer" is a layer formed by plural aggregations; and there may be holes or openings present between aggregations in the aggregation layer in some cases.

In the present aspect, preferably, the first region and the second region of the shielding pattern having different transmittances are respectively an opening region and a shielding region. In this case, the roughness of the first aggregation layer corresponding to the opening region of the shielding pattern is larger than that of the first aggregation layer corresponding to the shielding region thereof.

In the display panel of the present aspect, the first aggregation layer may comprise a corresponding opening region and a corresponding shielding region, the corresponding opening region and the corresponding shielding region respectively correspond to the opening region (or the first region) and the shielding region (or the second region) of the shielding pattern, and a projection of the opening region (or the first region) of the shielding region is located in the corresponding opening region of the first aggregation layer. Herein, a width of the opening region of the shielding pattern is α, a width of the corresponding opening region of the first aggregation layer is β, a thickness of the liquid crystal layer is D, and α, β and D satisfy the following equation (I):

$$0.0002\alpha^2 + 0.9888\alpha + 1.637D - 4.2987 < \beta < 0.0002\alpha^2 + 0.9888\alpha + 1.637D + 11.5657 \quad (I).$$

In addition, another aspect of the present invention further provides a display panel prepared with the aforementioned method, which comprises: a first substrate; a second substrate opposite to the first substrate; a liquid crystal layer disposed between the first substrate and the second substrate; a shielding pattern disposed on the second substrate and comprising an opening region and a shielding region;

and a corresponding opening region disposed on a side of the first substrate facing to the second substrate and corresponding to the opening region of the shielding pattern, wherein a projection of the opening region of the light shielding layer is located in the corresponding opening region, and a first aggregation layer (or a first aggregation layer formed with plural first aggregations) is disposed therein. Herein, a width of the opening region of the shielding pattern is α, a width of the corresponding opening region is β, a thickness of the liquid crystal layer is D, and α, β and D satisfy the aforementioned equation (I).

In the display panel of the present aspect, the corresponding opening region preferably is a reflected pattern. More specifically, the corresponding opening region is a reflected pattern obtained with a reflection microscope, which is formed by the different reflections of the corresponding opening region and the other region (the corresponding shielding region) while light is irradiated thereon. In the present aspect, a wavelength of the irradiated light is located in a visible region (380 nm~780 nm). In addition, the display panel of the present aspect may further comprise a corresponding shielding region disposed on a side of the second substrate facing to the first substrate and corresponding to the shielding region of the shielding pattern, wherein the first aggregation layer is disposed in the corresponding opening region and the corresponding shielding region, a roughness of the first aggregation layer disposed in the corresponding opening region is larger than that of the first aggregation layer disposed in the corresponding shielding region.

In the display panels provided by all the aforementioned aspects of the present invention, the shielding pattern is a black matrix layer or a patterned metal layer such as circuits.

In addition, the display panels provided by all the aforementioned aspects of the present invention may further comprise a second aggregation layer disposed on a side of the second substrate facing to the first substrate, wherein a roughness of the second aggregation layer corresponding to the opening region (or the first region) of the shielding pattern is larger than that of the second aggregation layer corresponding to the shielding region (or the second region) thereof.

Furthermore, in the display panels provided by all the aforementioned aspects of the present invention, a roughness of the first aggregation layer corresponding to the opening region (or the first region) of the shielding pattern is larger than that of the second aggregation layer corresponding to the opening region (or the first region) thereof; and/or a roughness of the first aggregation layer corresponding to the shielding region (or the second region) of the shielding pattern is larger than that of the second aggregation layer corresponding to the shielding region (or the second region) thereof. More specifically, during the process for preparing the display panel of the present invention, light is irradiated from the second substrate, so the first substrate is considered as a far side and the second substrate is considered as a near side. Hence, the roughness of the first aggregation layer corresponding to the opening region (or the first region)/the shielding region (or the second region) of the shielding pattern at the far side is respectively larger than that of the second aggregation layer corresponding thereto at the near side. However, for either the first aggregation layer at the far side or the second aggregation layer at the near side, the roughness of the first aggregation layer or the second aggregation layer corresponding to the opening region of the shielding pattern is larger than that of the first aggregation layer or the second aggregation layer corresponding to the shielding region thereof. Preferably, the roughness of the first aggregation layer or the second aggregation layer corresponding to the opening region of the shielding pattern is 5~12 times of that of the first aggregation layer or the second aggregation layer corresponding to the shielding region thereof.

In addition, in the display panels provided by all the aforementioned aspects of the present invention, the term "roughness" refers to Root Mean Square (RMS) roughness (Rq), which is the RMS average between the height deviations and the central line along a longitude of the sample.

Furthermore, in the display panels provided by all the aforementioned aspects of the present invention, the first aggregation layer comprises a corresponding opening region and a corresponding shielding region, and the corresponding opening region and the corresponding shielding region respectively correspond to the opening region (or the first region) and the shielding region (or the second region) of the shielding pattern. An average height between a surface of the corresponding opening region (or the central line along a longitude thereof) and a surface of a first alignment layer on the first substrate is at least 15 nm, preferably 15~100 nm, and more preferably 20~50 nm.

Other objects, advantages, and novel features of the invention will become more apparent from the following detailed description when taken in conjunction with the accompanying drawings.

DETAILED DESCRIPTION OF THE PREFERRED EMBODIMENT

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

Figure 1A:
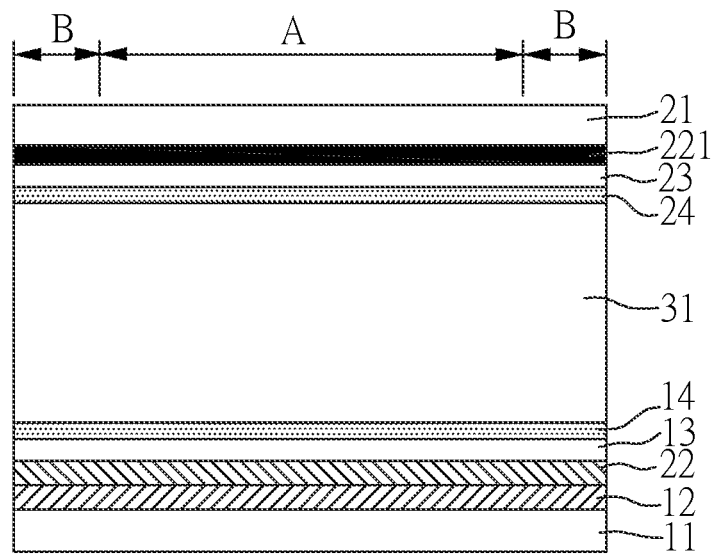
FIGS. 1A and 1B are cross-sectional views of liquid crystal display panels according to one preferred embodiment of the present invention.

FIG. 1A is a cross-sectional view of a liquid crystal display panel of the present embodiment.

As shown in FIG. 1A, a first substrate 11 and a second substrate 21 are provided, wherein a thin film transistor layer 12 and a color filter layer 22 are sequentially formed on the first substrate 11 to obtain a color filter on array (COA) display panel. In addition, a black matrix layer 221 is formed on the second substrate 21 as a light shielding pattern. Herein, the first substrate 11 and the second substrate 21 can be any substrate generally used in the art, such as plastic substrates or glass substrates.

Figure 1B:
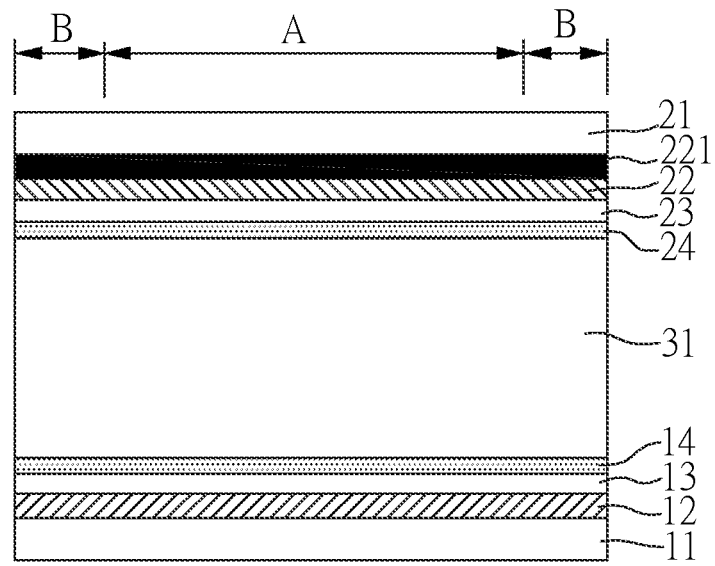

In other embodiment of the present embodiment, as shown in FIG. 1B, the thin film transistor layer 12 and the color filter layer 22 are respectively formed on the first substrate 11 and the second substrate 21, wherein the thin film transistor layer 12 is opposite to the color filter layer 22, the black matrix layer 221 as a light shielding pattern is formed on the color filter layer 22.

Hereinafter, the liquid crystal display panel of FIG. 1A is described in detail.

Figure 2:
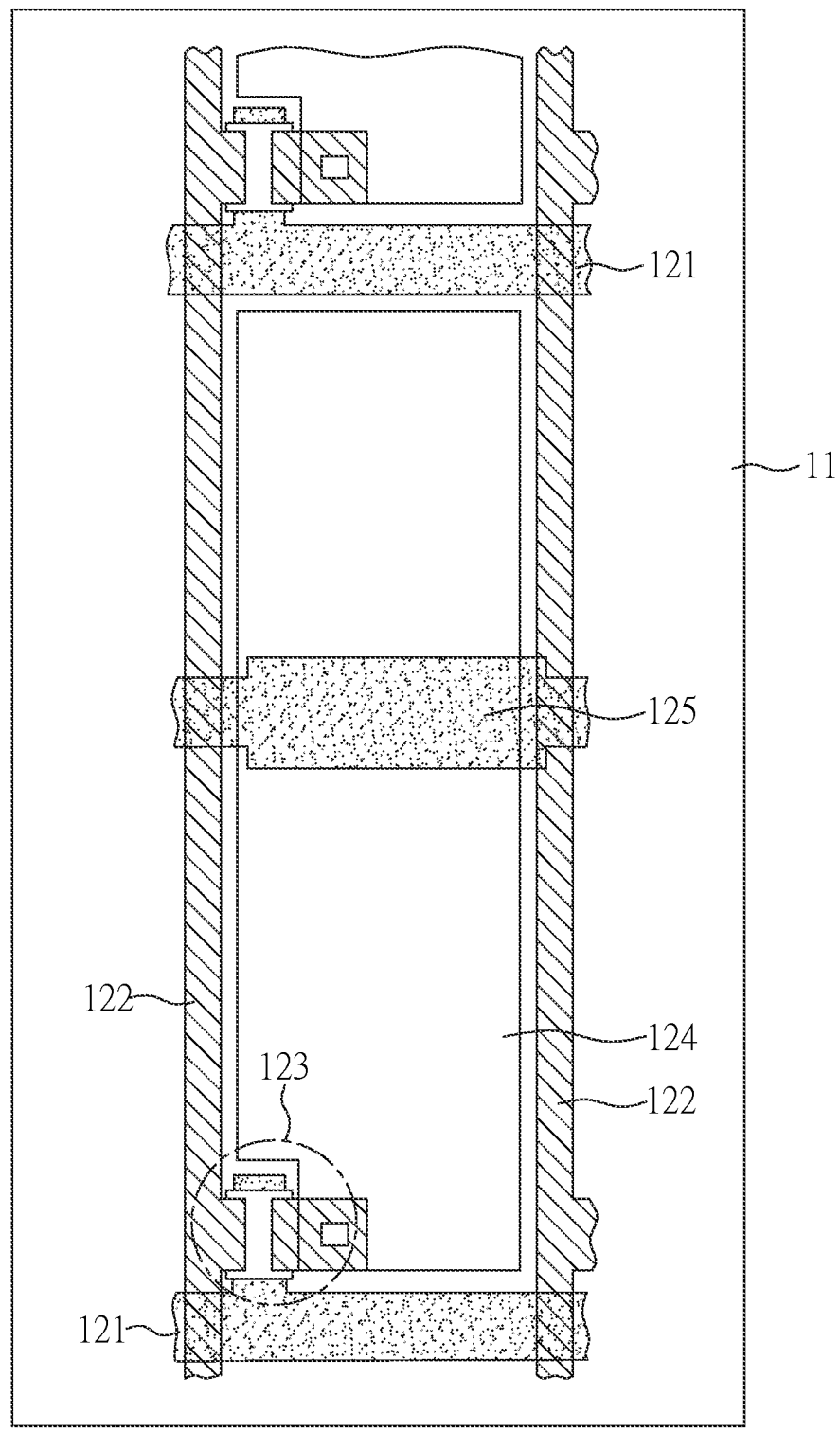
FIG. 2 is a perspective view showing a part of a first substrate and thin film transistors disposed thereon in a liquid crystal display panel according to one preferred embodiment of the present invention.

FIG. 2 is a perspective view showing a part of a first substrate and thin film transistors disposed thereon in the liquid crystal display panel of the present embodiment. The thin film transistor layer formed on the first substrate 11 comprises: scan lines 121, data lines 122, a thin film transistor unit 123, a pixel electrode 124 and a capacitor electrode 125. Herein, two adjacent scan lines 121 and two adjacent data lines 122 define a pixel unit. One pixel unit comprises: one thin film transistor unit 123, one pixel electrode 124 and one capacitor electrode 125, and the pixel electrode 124 is located between two adjacent scan lines 121 and two adjacent data lines 122. Herein, the scan lines 121, the data lines 122 and the capacitor electrode 125 can be made with any conductive material generally used in the art, such as metal, alloy, metal oxide, metal oxynitrides, or other electrode materials used in the art; and preferably metal. The pixel electrode 124 can be made with any transparent conductive material generally used in the art, for example, transparent conductive oxides such as ITO, IZO or a combination thereof (for example, a composite material of ITO and IZO). In other embodiments, the location of the capacitor electrode 125 is not limited to that shown in FIG. 2, and can be adjusted if necessary.

Figure 3:
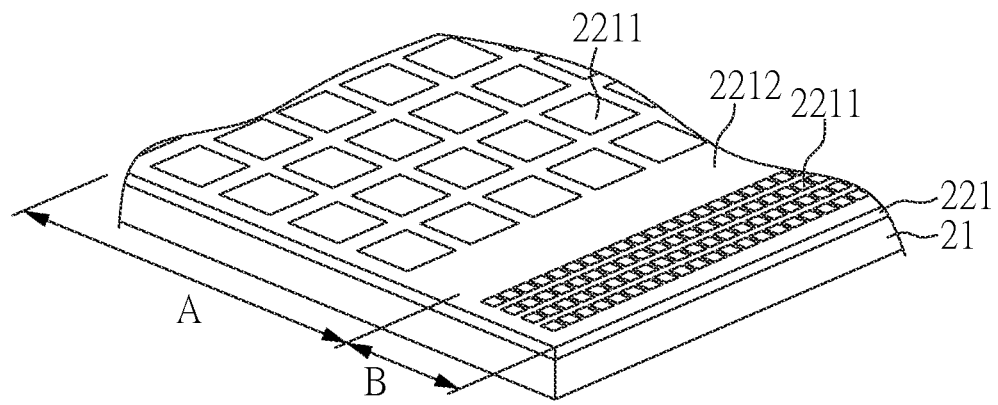
FIG. 3 is a perspective view showing a part of a second substrate and a black matrix layer disposed thereon in a liquid crystal display panel according to one preferred embodiment of the present invention.

FIG. 3 is a perspective view showing a part of a second substrate and a black matrix layer disposed thereon in the liquid crystal display panel of the present embodiment. Herein, the black matrix 211 formed on the second substrate 21 comprises: opening regions 2211 and a shielding region 2212 disposed between the opening regions 2211. In addition, the second substrate 21 may further comprise a display region A and a non-display region B.

As shown in FIG. 1A, a first alignment layer 13 and a second alignment layer 23 formed with polyimide are respectively formed on the first substrate 11 and the second substrate 21, followed by injecting a liquid crystal material into a space between the first substrate 11 and the second substrate 21 to form a liquid crystal layer 31. Herein, the liquid crystal material comprises: liquid crystal molecules and photosensitive monomer. The liquid crystal material can be injected into the space between the first substrate 11 and the second substrate 21 through any known manner used in the art, such as a drop-type injection process or an injection method using a capillary effect. In addition, the liquid crystal material may further comprise a photo-initiator to facilitate the polymerization of the photosensitive monomers. In the present embodiment, the photosensitive monomers and the photo-initiator are not particularly limited, and can be any compounds generally used in the art for forming the alignment layer.

Then, as shown in FIG. 1A, an energy is applied onto the display panel to polymerize the photosensitive monomers to form a first aggregation layer 14 and a second aggregation layer 24, which are respectively formed on the first substrate 11 and the second substrate. Both the formed first aggregation layer 14 and the formed second aggregation layer 24 have the property of causing the pre-tilt angles of the liquid crystal molecules. More specifically, the photosensitive monomers are polymerized through an irradiation such as UV light to form aggregations, wherein the first aggregation layer 14 is composed of plural first aggregations formed on the first substrate 11, and the second aggregation layer 14 is composed of plural second aggregations formed on the second substrate 21. Since the first aggregation layer 14 and the second aggregation layer 24 are respectively composed of plural first aggregations and plural second aggregations, there may be holes or openings formed between the first or second aggregations.

In addition, as shown in FIG. 1A, during the polymerization process, no additional voltage is applied to the non-display region B, so an improved vertical alignment of the liquid crystal molecules in the non-display region B can be achieved. Thus, the liquid crystal molecules in the non-display region B can recover more quickly when an external voltage is applied onto the liquid crystal panel. Furthermore, during the polymerization process, an additional voltage is applied to the display region A to make the liquid crystal molecules in the liquid crystal layer 31 tilt in a predetermined angle. After the photosensitive monomers are polymerized to obtain the first aggregation layer formed with plural first aggregations and the second aggregation layer formed with plural second aggregations having specific structures, the specific structures can fix the pre-tilt angles of the liquid crystal molecules in the display region A. Thus, the liquid crystal molecules can be tilted rapidly to exchange the bright state and the dark state of the display panel quickly.

Hereinafter, the structures of the first aggregation layer and the second aggregation layer in the liquid crystal display panel of the present embodiment are described in detail.

As shown in FIG. 1A, the first aggregation layer 14 and the second aggregation layer 24 of the present embodiment are formed with the aggregations, which are obtained by polymerizing the photosensitive monomers through the irradiation such as UV light. Herein, the irradiation can be applied from the first substrate 11 or the second substrate 12. For example, in the display panel shown in FIG. 1A, the irradiation is preferably applied from the second substrate 21; and in the display panel shown in FIG. 1B, the irradiation is preferably applied from the first substrate 11. However, in other embodiment, the irradiation may be respectively applied from the first substrate 11 and the second substrate 21, and more than one time for the irradiation process can be performed.

Figure 4:
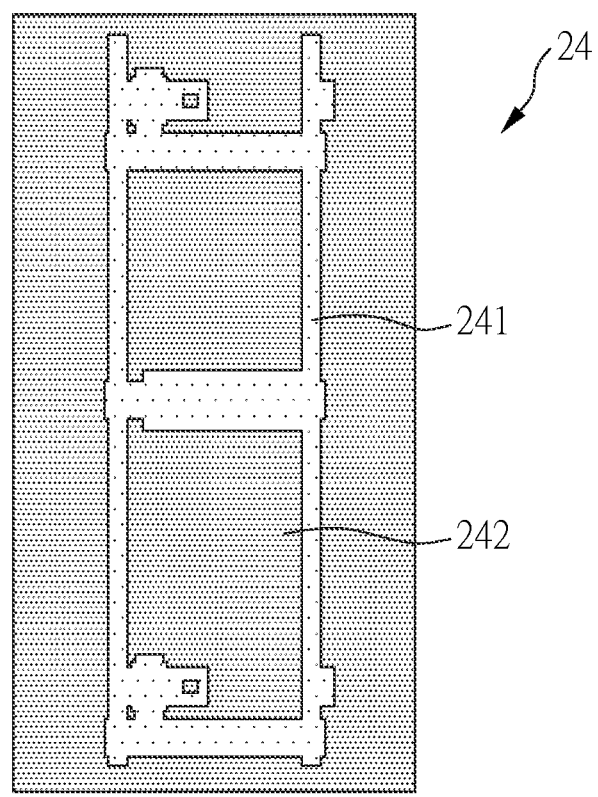
FIG. 4 is a perspective view showing a pattern of a second aggregation layer in a liquid crystal display panel according to one preferred embodiment of the present invention.

As shown in FIG. 1B and FIG. 2, in one preferred embodiment of the present invention, when an irradiation is applied from the first substrate 11, the thin film transistor layer 12 (which comprises at least one patterned metal layer) disposed on the first substrate 11 can be used as a shielding pattern. More specifically, the patterned metal layer disposed on the first substrate 11 may comprise: circuits (not shown in the figure), the scan lines 121, the data lines 122, and the capacitor electrode 125. Herein, the region comprising the circuits (not shown in the figure), the scan lines 121, the data lines 122, and the capacitor electrode 125 can be used as a second region or a shielding region of the shielding pattern, and the other region (for example, the pixel electrode 124 or other region of the first substrate without any units formed thereon) can be used as a first region or an opening region of the shielding pattern. The metal layer has relatively low transmittance in comparison with the other region, wherein the transmittance of the metal layer as the second region of the shielding pattern is about 0~20%, and that of the first region thereof is about 30~100%. The transmittance of the shielding pattern is differed according to the material of the first substrate 11 and the presence units formed thereon. Hence, when an irradiation is applied from the first substrate 11, the polymerization degrees of the photosensitive monomers can be differed in the second region (i.e. the shielding region) and the first region (i.e. the opening region) by adjusting the related parameters of the irradiation; and thus the first aggregation layer 14 and the second aggregation layer 24 having different structures can be obtained. For example, as shown in FIG. 2 and FIG. 4, when the irradiation is applied from the first substrate 11, the second aggregation 24 formed on the second substrate 21 may have a pattern comprising a corresponding shielding region 241 and a corresponding opening region 242.

Figure 5:
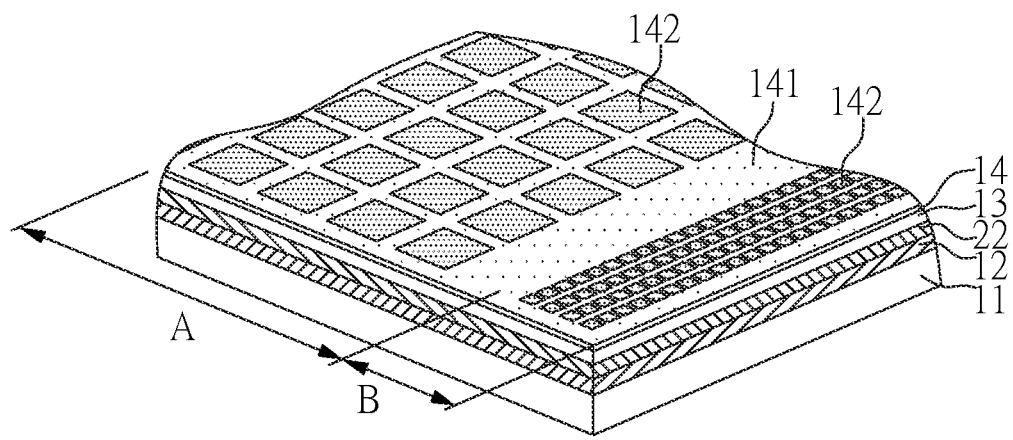
FIG. 5 is a perspective view showing a pattern of a first aggregation layer in a liquid crystal display panel according to one preferred embodiment of the present invention.

As shown in FIG. 1A and FIG. 3, in one preferred embodiment of the present invention, the black matrix layer 221 on the second substrate 21 can be used as a shielding pattern when the irradiation is applied from the second substrate 21, wherein the black matrix layer 21 comprises a shielding region 2212 (i.e. a second region) and an opening region 2211 (i.e. a first region). The shielding region 2212 has relatively low transmittance in comparison with the opening region 2211. Herein, the black matrix layer 221 is used as a shielding pattern, so the transmittance of the shielding region 2212 (i.e. the second region) is approximately 0%. The transmittance of the opening region 2211 (i.e. the first region) is about 30~100%, which may be differed according to the material of the second substrate 21 and the presence of units formed thereon. When the irradiation is applied from the second substrate 21, the polymerization degrees of the photosensitive monomers can be differed in the second region (i.e. the shielding region) and the first region (i.e. the opening region) by adjusting the related parameters of the irradiation; and thus the first aggregation layer 14 and the second aggregation layer 24 having different structures can be obtained. For example, as shown in FIG. 1A and FIG. 5, when the irradiation is applied from the second substrate 21, the first aggregation 14 formed on the first substrate 11 may have a pattern comprising a corresponding shielding region 141 and a corresponding opening region 142.

Herein, the corresponding shielding region 141 and the corresponding opening region 142 can be defined with a reflected pattern, which is preferably obtained with a reflection microscope. The reflected pattern is obtained by the different reflections of the corresponding opening region and the corresponding shielding region while light is irradiated thereon. In the present embodiment, the light for obtaining the reflected pattern has a wavelength located in a visible region (380 nm~780 nm). However, in other embodiment, the corresponding shielding region 141 and the corresponding opening region 142 of the first aggregation layer 14 can be defined through other methods, for example, the roughness of the aggregation layer.

Figure 6:
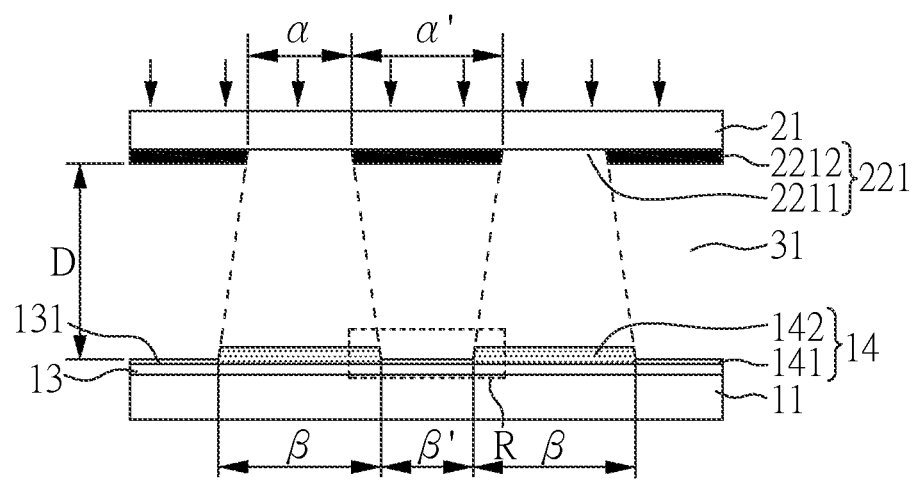
FIG. 6 is a perspective view showing a first aggregation layer and a black matrix layer in a non-display region of a liquid crystal display panel according to another preferred embodiment of the present invention.

As shown in FIG. 6 (wherein, the thin film transistor layer and the first alignment layer on the first substrate 11, and the second alignment layer on the second substrate 21 are not shown), a first aggregation layer 14 comprising a corresponding shielding region 141 and a corresponding opening region 142 is formed on a side of the first substrate 11 facing to the second substrate 21 when the irradiation is applied from the second substrate 21. Herein, the corresponding shielding region 141 and the corresponding opening region 142 respectively correspond to the shielding region 2212 and the opening region 2211 of the black matrix layer 221 as a shielding pattern disposed on the second substrate 21, and a projection of the opening region 2211 of the shielding pattern is located in the corresponding opening region 142. In the present embodiment, the black matrix layer 221 is one example of the shielding layer, but the shielding layer can be other metal pattern or other shielding pattern in other embodiments of the present invention. In the case that a width of the opening region 2211 of the shielding pattern is α, a width of the corresponding opening region 142 of the first aggregation layer 14 is β, and a thickness of the liquid crystal layer 31 (also called as a cell gap) is D, α, β and D satisfy the following equation (I):

$$0.0002\alpha^2+0.9888\alpha+1.637D-4.2987<\beta<0.0002\alpha^2+0.9888\alpha+1.637D+11.5657 \quad (I).$$

In the present embodiment, the width α of the opening region 2211 of the shielding pattern is 98.72 μm, the distance α' between two adjacent opening regions 2211 is 52.32 μm, the thickness D of the liquid crystal layer 31 is 3.2 μm, the width β of the corresponding opening region 142 of the first aggregation layer 14 is 104.04 μm, and the distance β' between two adjacent corresponding opening regions 142 is 47 μm. However, in other embodiments of the present invention, α, α', β, β' and D are not limited to the aforementioned values, as long as these parameters satisfy the aforementioned equation (I). When these parameters satisfy the equation (I), the corresponding opening region of the first aggregation layer having a predetermined width can be obtained by controlling the width α of the opening region of the shielding pattern and the thickness D of the liquid crystal layer.

In addition, as shown in FIG. 6, the first aggregations of the first aggregation layer 14 are formed in both the corresponding shielding region 141 and the corresponding opening region 142 in the present embodiment. However, in other embodiment, as long as the first aggregations are formed in the corresponding opening region 142, the first aggregations may not be formed in the corresponding shielding region 141 since there may be holes or openings formed between the aggregations of the aggregation layer. In this case, a part of the first substrate 11 and some units formed thereon may be exposed from the corresponding shielding region 141.

Figure 7:
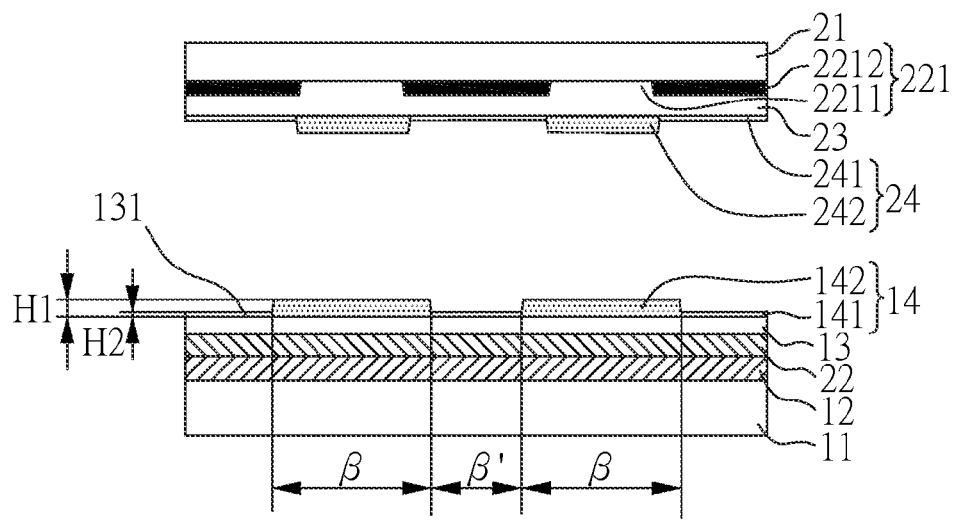
FIG. 7 is a perspective view showing a first aggregation layer and a black matrix layer in a non-display region of a liquid crystal display panel according to another preferred embodiment of the present invention.

Furthermore, as shown in FIG. 7, when the irradiation is applied from the second substrate 21, not only the first aggregation layer 14 is formed on the first substrate 11, but also the second aggregation layer 24 is formed on a side of the second substrate 21 facing to the first substrate 11. Herein, the second aggregation layer 24 also comprises a corresponding shielding region 241 and a corresponding opening region 242, which respectively correspond to the shielding region 2212 and the opening region 2211 of the black matrix layer 221 as the shielding pattern on the second substrate 21.

In the present embodiment, the roughness of the first aggregation layer 14 and the second aggregation layer 24, which can facilitate the tilt of the liquid crystal molecules when operating the liquid crystal display panel, can be adjusted by controlling the focus, the energy and the irradiating time of the irradiation. Preferably, as shown in FIG. 6 and FIG. 7, the roughness of the corresponding opening region 142 of the first aggregation layer 14 is larger than that of the corresponding shielding region 141 thereof; and/or the roughness of the corresponding opening region 242 of the second aggregation layer 24 is larger than that of the corresponding shielding region 241 thereof. In addition, the roughness of the corresponding opening region 142 of the first aggregation layer 14 is preferably larger than that of the corresponding opening region 242 of the second aggregation layer 24. More preferably, the roughness of the corresponding opening region 142 of the first aggregation layer 14 or the corresponding opening region 242 of the second aggregation layer 24 is 5~12 times of that of the corresponding shielding region 141 and the corresponding shielding region 241. Herein, the term "roughness" refers to Root Mean Square (RMS) roughness (Rq), which is the RMS average between the height deviations and the central line along a longitude of the sample (i.e. the first aggregation layer or the second aggregation layer).

As shown in FIG. 7, in the present embodiment, the roughness of the corresponding opening region 142 of the first aggregation layer 14 is about 24.8 nm, and the corresponding shielding region 141 thereof is about 3.37 nm. The roughness of the corresponding opening region 242 of the second aggregation layer 24 is about 18 nm, and the corresponding shielding region 241 thereof is about 2.46 nm. However, in other embodiment, the roughness of the first aggregation layer 14 and the second aggregation layer 24 is not limited thereto. As long as the roughness of the corresponding opening regions and the corresponding shielding regions of the first aggregation layer and the second aggregation layer satisfy the aforementioned relations, the purpose of facilitating the tilts of the liquid crystal molecules during the operation of the liquid crystal display panel can be achieved.

Furthermore, as shown in FIG. 7, the first aggregation layer 14 and the second aggregation layer 24 can be adjusted to have various heights in different regions by controlling the focus, the energy and the irradiating time of the irradiation. For example, the average height between a surface of the corresponding opening region 142 of the first aggregation layer 14 and a surface 131 of a first alignment layer 13 on the first substrate 11 is at least 15 nm larger than that between a surface of the corresponding shielding region 141 thereof and the surface 131, i.e. $\Delta H=(H1-H2)\geq 15$ nm. Preferably, the aforementioned average height difference is 15~100 nm (100 nm$\geq\Delta H=(H1-H2)\geq 15$ nm); and more preferably, the aforementioned average height difference is 20~50 nm (50 nm$\geq\Delta H=(H1-H2)\geq 20$ nm).

Figure 8:
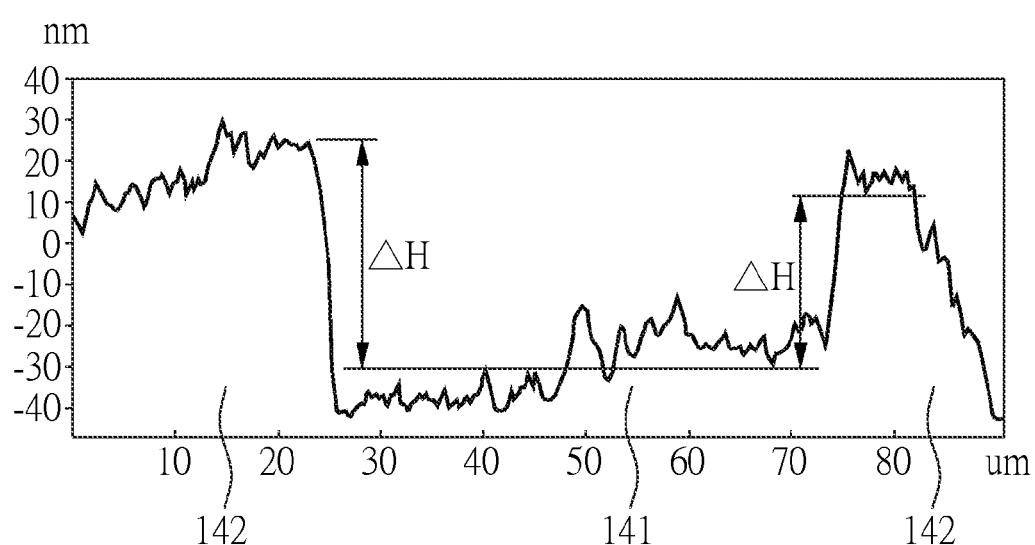
FIGS. 8 to 10 are enlarged views of a first aggregation layer in liquid crystal display panels according to other preferred embodiments of the present invention.
Figure 9:
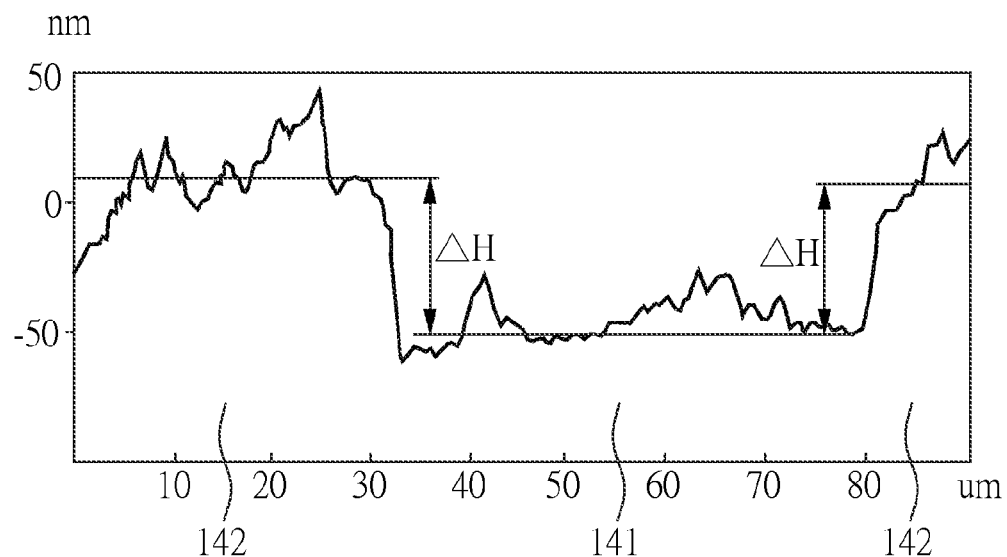
Figure 10:
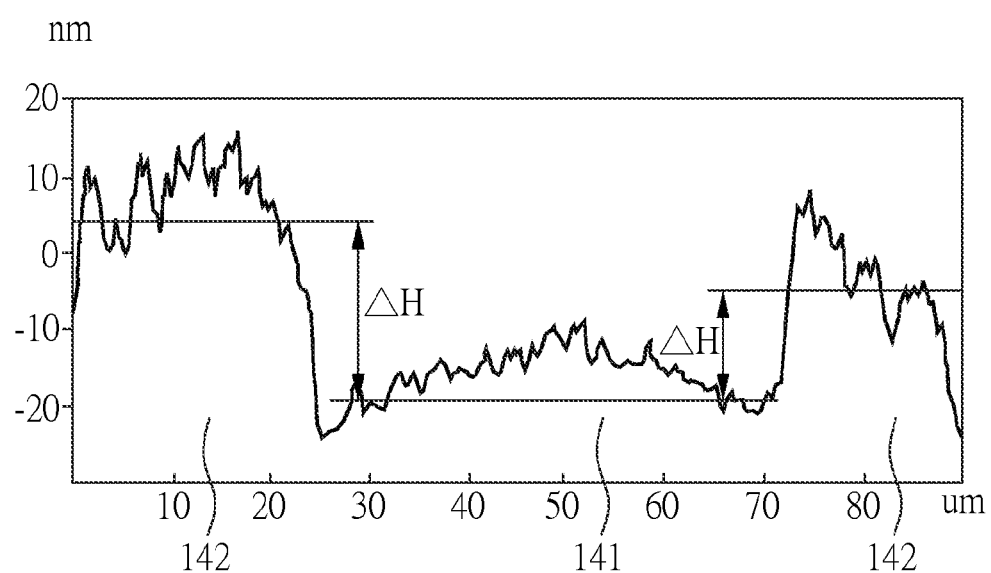

FIGS. 8 to 10 are enlarged views of first aggregation layers of liquid crystal display panels indicated by the region R shown in FIG. 6, wherein the horizontal lines indicate the average height of the corresponding shielding region 141 and the corresponding opening region 142, the unit of the X-axis is μm, and the unit of the Y-axis is nm. As shown in FIGS. 8 to 10, the first aggregation layer may have different structures in the liquid display panels of different embodiments, and there is a height difference $\Delta H$ between the corresponding shielding region 141 and the corresponding opening region 142. The height difference $\Delta H$ is at least 15 nm, preferably 15~100 nm, and more preferably 20~50 nm.

In conclusion, when an irradiation is applied from a second substrate during the process for manufacturing a liquid crystal display panel of the present invention, the opening region of the black matrix layer can facilitate the polymerization of the photosensitive monomers. In the conventional display panel, the opening region of the black matrix layer may cause light leakage. However, in the liquid crystal display panel of the present invention, the corresponding opening region of the first aggregation layer opposite to the opening region of the black matrix layer has relative large roughness, and the increased roughness of the corresponding opening region can facilitate the tilt of the liquid crystal molecules. Hence, the tilt of the liquid crystal molecules can recover rapidly after a voltage is applied thereto during the operation of the liquid crystal display panel, and thus the light leakage can be prevented. In addition, in order to obtain better orientation of liquid crystal molecules, no additional voltage is applied to the non-display region during the polymerization process, so an improved vertical alignment of the liquid crystal molecules in the non-display region can be achieved. Thus, the liquid crystal molecules in the non-display region can recover more quickly when an external voltage is applied onto the liquid crystal panel. In addition, during the polymerization process, an additional voltage is applied to the display region to make the liquid crystal molecules in the liquid crystal layer tilt in a predetermined angle, and thus the bright state and the dark state of the display panel can be exchanged rapidly.

Herein, only the display panel shown in FIG. 1A is illustrated in detail. For a person skilled in the art, the aggregation layer of the display panel shown in FIG. 1B also have the aforementioned characteristics.

Furthermore, the display device provided by the present invention can be applied to any electronic device for displaying images, such as a mobile phone, a notebook, a camera, a video camera, a music player, a navigation system, or a television.

Although the present invention has been explained in relation to its preferred embodiment, it is to be understood that many other possible modifications and variations can be made without departing from the spirit and scope of the invention as hereinafter claimed.

What is claimed is:

1. A display panel, comprising:
a first substrate;
a second substrate opposite to the first substrate;
a liquid crystal layer disposed between the first substrate and the second substrate;
a shielding pattern disposed on the second substrate and defining a first region and a second region, wherein a transmittance of the first region is larger than a transmittance of the second region;
a first polymer layer in contact with the liquid crystal layer and disposed on a side of the first substrate facing to the second substrate, wherein a roughness of the first polymer layer corresponding to the first region is larger than a roughness of the first polymer layer corresponding to the second region; and
a second polymer layer in contact with the liquid crystal layer and disposed on a side of the second substrate facing to the first substrate, wherein a roughness of the second polymer layer corresponding to the first region is larger than a roughness of the second polymer layer corresponding to the second region.

2. The display panel as claimed in claim 1, wherein the transmittance of the first region is between 30 and 100%, or the transmittance of the second region is between 0 and 20%.

3. The display panel as claimed in claim 1, wherein the first region corresponds to an opening region, and the second region corresponds to a shielding region.

4. The display panel as claimed in claim 1, wherein the shielding pattern is a black matrix layer or a patterned metal layer.

5. The display panel as claimed in claim 1, wherein the roughness of the first polymer layer corresponding to the first region is larger than the roughness of the second polymer layer corresponding to the first region.

6. The display panel as claimed in claim 5, wherein the roughness of the first polymer layer or the second polymer layer corresponding to the first region is 5 to 12 times of the roughness of the second polymer layer corresponding to the second region.

7. The display panel as claimed in claim 1, wherein the first polymer layer comprises a corresponding opening region and a corresponding shielding region, the corresponding opening region and the corresponding shielding region respectively correspond to the first region and the second region, a width of the first region is $\alpha$, a width of the corresponding opening region of the first polymer layer is $\beta$, a thickness of the liquid crystal layer is D, and values of $\alpha, \beta$ and D satisfy the following equation (I):

$$0.0002\alpha^2+0.9888\alpha+1.637D-4.2987<\beta<0.0002\alpha^2+0.9888\alpha+1.637D+11.5657 \quad (I),$$

wherein the units of $\alpha, \beta$ and D are in micrometer.

* * * * *